UNITED STATES PATENT OFFICE.

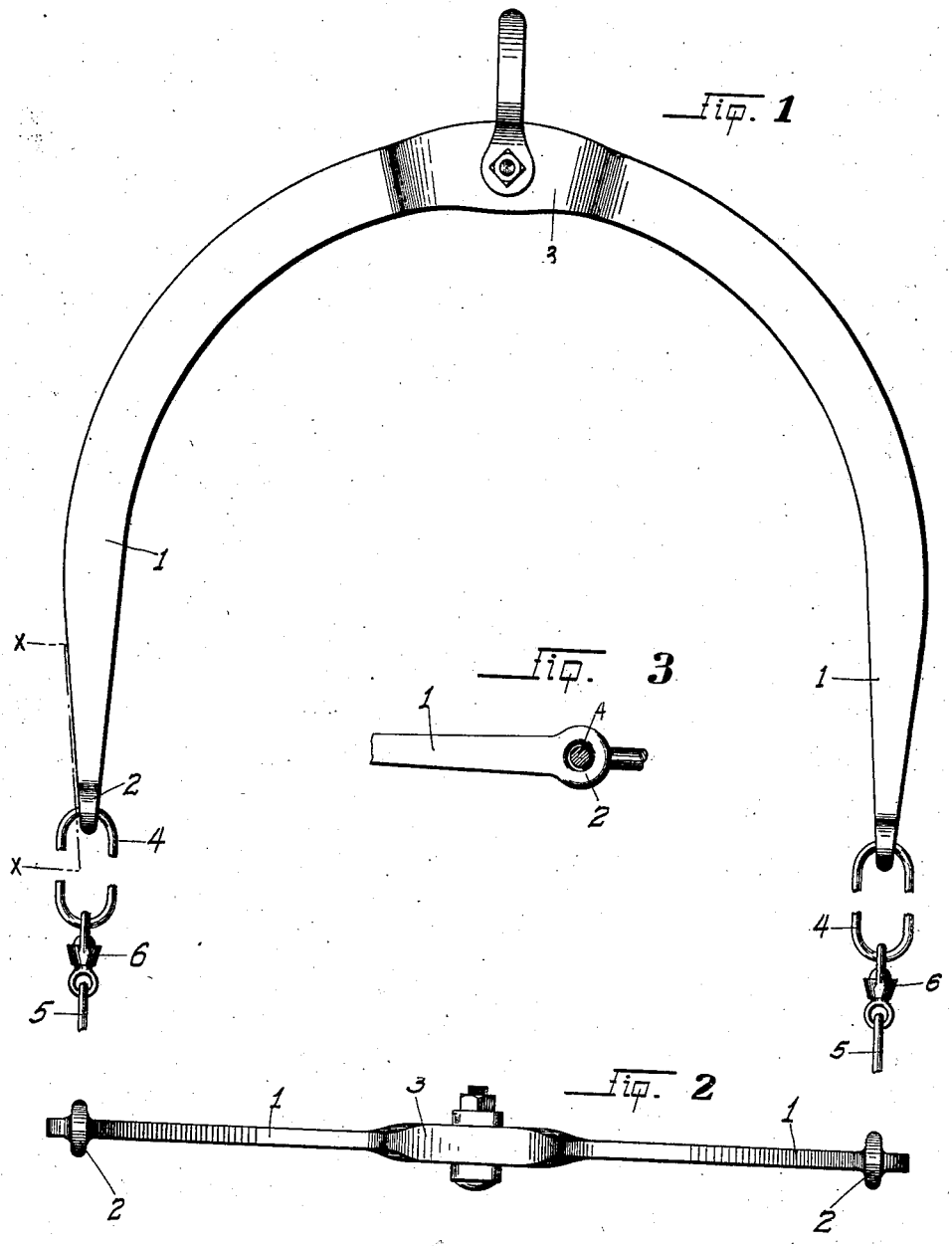

ALBERT J. JEFFERSON, OF LODI, CALIFORNIA.

SWINGLETREE.

No. 884,389.   Specification of Letters Patent.   Patented April 14, 1908.

Application filed May 6, 1907. Serial No. 372,267.

*To all whom it may concern:*

Be it known that I, ALBERT J. JEFFERSON, a citizen of the United States, residing at Lodi, in the county of San Joaquin and State of California, have invented certain new and useful Improvements in Swingletrees; and I do declare the following to be a full, clear, and exact description of the same, such as will enable others skilled in the art to which it appertains to make and use the same, reference being had to the accompanying drawings, and to the characters of reference marked thereon, which form a part of this specification.

This invention relates to improvements in swingle trees used on any manner of vehicle, my object being to produce such a swingle tree as may be used on plows, harrows or the like, in vineyards or similar places without danger of knocking off young and tender shoots from the vines, or injuring them otherwise, as is now the case with straight swingle trees, the ends of which move with the movement of the horse and strike and injure the vines, as it is impossible for the operator of the implement to guide his implement and swingle tree at the same time. This object I accomplish by means of a curved substantially U-shaped swingle tree whereby the sides are smooth and extend upward toward the horse, thus clearing the vines and presenting only a narrow and smooth surface near the said vines, whereby is avoided the danger of damage as described above.

In the drawings similar characters of reference indicate corresponding parts in the several views.

Figure 1 is a top plan view of my improved swingle tree. Fig. 2 is a front end view of the same. Fig. 3 is a sectional view on a line *x x* of Fig 1.

Referring more particularly to the characters of reference on the drawings 1 designates the swingle tree proper which is constructed of flat metal formed into a substantially U-shape as shown in the drawings. The ends of such U-shaped swingle tree bend gradually into vertical rings 2. At the base of said swingle tree the metal is formed gradually into an embossed or enlarged portion 3, such enlargement being substantially equal on all sides, said enlargement being provided with a central orifice to receive the pin of a clevis or other joining means. Disposed in the rings 2 are links 4 and 5 are other links secured to the links 4 by intermediate swivels 6.

In practice the links 5 are hooked into the tug hooks, which lifts the ends of the swingle tree up near the horse and high enough to clear the vines, the part of the swingle tree which is near the vines being narrow and having smooth, curving sides and no abrupt ends to knock into or break the vines.

The embossment or enlargement 3 is disposed at a point where the greatest bearing strain comes on the swingle tree and where the same would be the most likely to bend or wear, thus lessening the danger of such wear or bending.

The swivels 6 permit of a freedom of motion to the link 5 but may be dispensed with if desired.

Thus it will be seen I have produced a swingle tree which substantially fulfils all the objects of the invention as set forth herein.

While this specification sets forth in detail the present and preferred construction of my device, in practice many small deviations from such detail may be resorted to at will without departing from the spirit of the invention.

Having thus described my invention what I claim as new and useful and desire to secure by Letters Patent is:—

In a device of the character described a swingle tree formed of flat metal into a substantial U-shape, the outer ends of said swingle tree being turned gradually into vertical rings, the inner end of such swingle tree being swaged or swelled outward on all sides, forming an embossment, an orifice through such embossment, and tug connections in said rings, as described.

In testimony whereof I affix my signature in presence of two witnesses.

ALBERT J. JEFFERSON.

Witnesses:
PERCY S. WEBSTER,
FRANK H. CARTER.